(No Model.) 2 Sheets—Sheet 2.
W. E. HILL.
SAWING MACHINE.
No. 276,401. Patented Apr. 24, 1883.
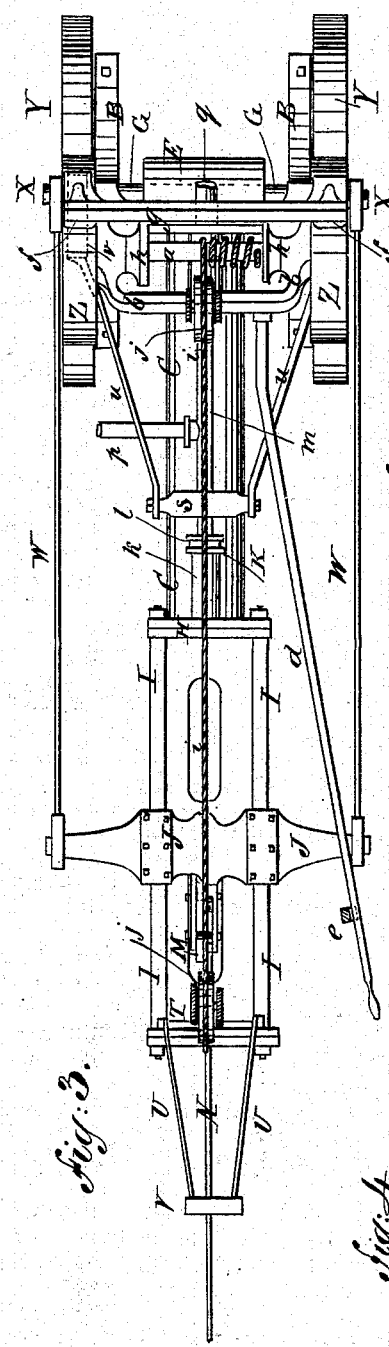
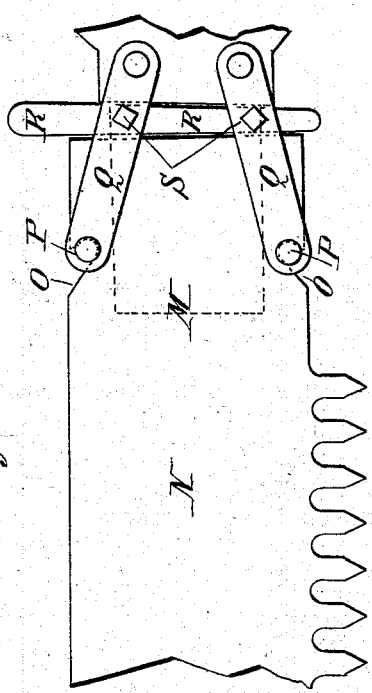
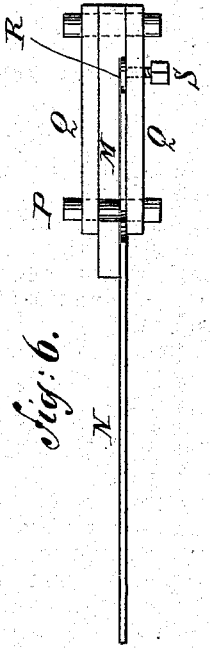
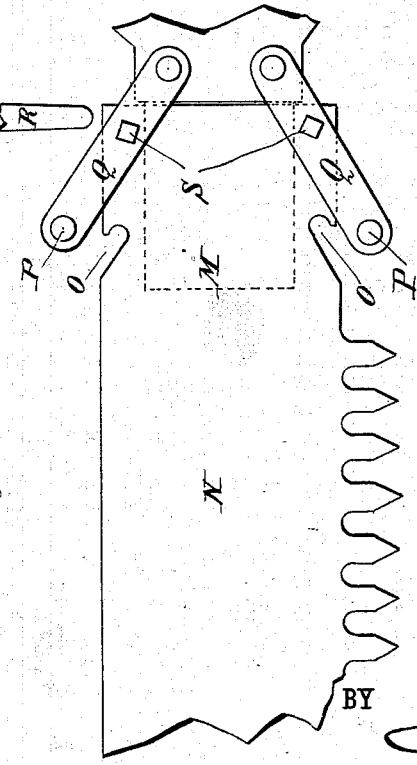
WITNESSES:
INVENTOR:
W. E. Hill
BY
ATTORNEYS.

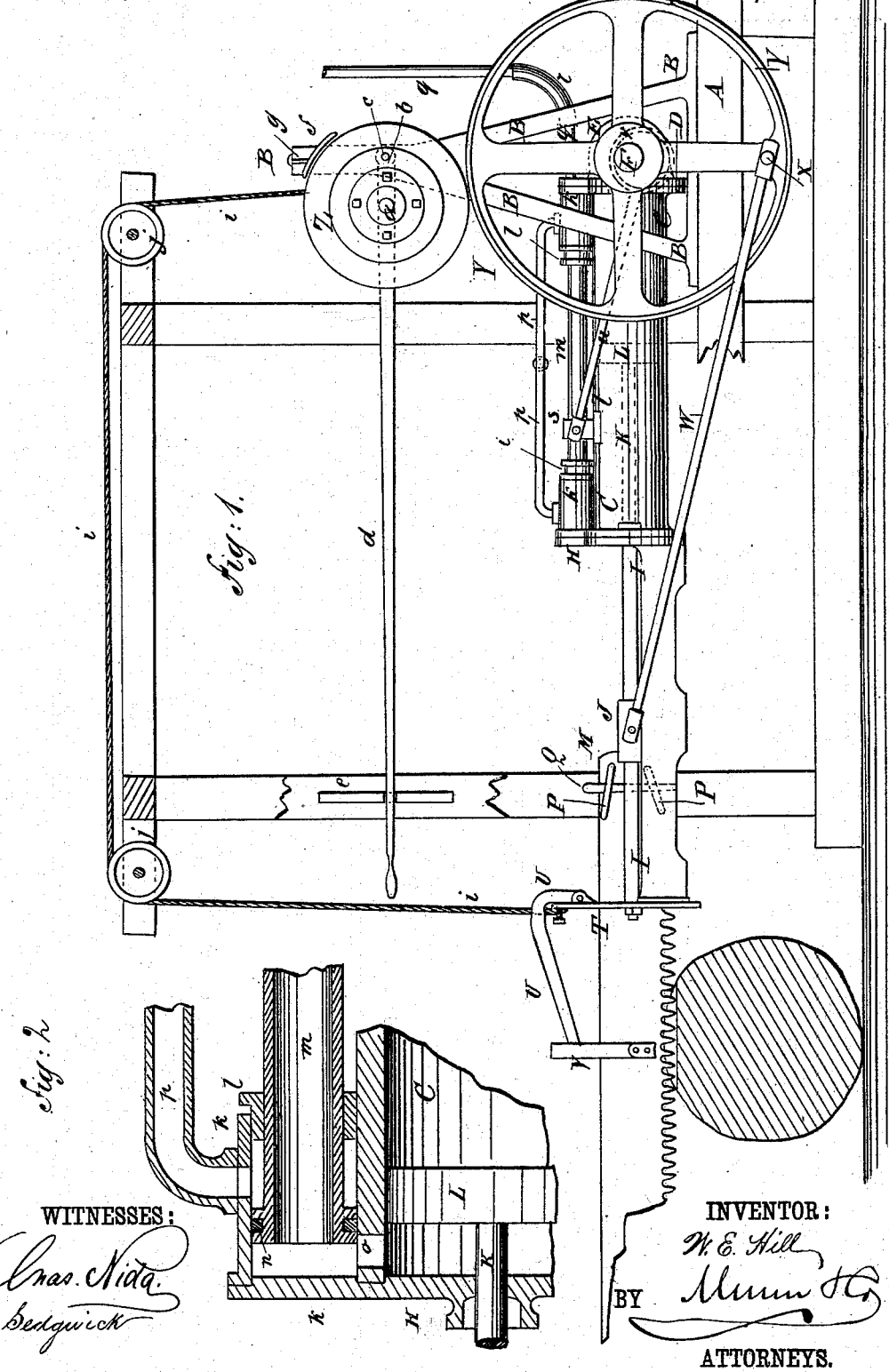

UNITED STATES PATENT OFFICE.

WILLIAM E. HILL, OF KALAMAZOO, MICHIGAN.

SAWING-MACHINE.

SPECIFICATION forming part of Letters Patent No. 276,401, dated April 24, 1883.

Application filed October 3, 1882. (No model.)

*To all whom it may concern:*

Be it known that I, WILLIAM E. HILL, of Kalamazoo, in the county of Kalamazoo and State of Michigan, have invented a new and useful Improvement in Sawing-Machines, of which the following is a full, clear, and exact description.

Reference is to be had to the accompanying drawings, forming part of this specification, in which similar letters of reference indicate corresponding parts in all the figures.

Figure 1, Sheet 1, is a side elevation of my improvement. Fig. 2, Sheet 1, is a sectional side elevation of a part of the steam-cylinder and its valve. Fig. 3, Sheet 2, is a plan view of the improvement. Fig. 4, Sheet 2, is a side elevation of a part of the saw and cross-head, showing the saw unfastened and ready to be detached. Fig. 5, Sheet 2, is the same view as Fig. 4, but showing the saw fastened to the cross-head. Fig. 6, Sheet 2, is a plan view of the same.

The object of this invention is to provide machines for sawing logs into blocks and bolts which shall be constructed in such a manner as to promote convenience in controlling the machine and economize power in driving the said machines.

The invention consists in a sawing-machine constructed with a steam-cylinder having a piston and cross-head, and carrying the cross-head slide and the saw-guide, and provided with a steam inlet and outlet mechanism, and a mechanism for raising the saw out of the kerf.

Upon the cross-head of the piston-rod is a plate rabbeted to receive the butt of the saw, and to said cross-head are hinged pairs of bars connected at their outer ends by pins to engage with the notched edges of the saw-butt, the said bars being locked in place by a key, whereby the saw will be firmly connected with the said cross-head. To the saw-guide attached to the cross-head slide is hinged a guide slotted to receive the saw and bear against the opposite sides of the saw, at the base of its teeth, to keep the saw in line when beginning its kerf. With the cross-head of the piston-rod are connected by rods and crank-pins a pair of friction-wheels to engage with and drive a pair of friction-pulleys attached to a shaft, to which is attached a rope or chain passing over guide-pulleys, and secured to the saw-guide attached to the cross-head slide, so that the saw can be raised out of its kerf by the movements of the piston. The shaft of the friction-pulleys is journaled to a frame which is hinged to the supporting-brackets, and is provided with a lever, so that the said friction-pulleys can be readily thrown into and out of gear with the friction-wheels. With the supporting-brackets are connected brake-shoes to engage with the friction-pulleys when thrown out of gear and stop their motion.

The invention consists in the construction and combination of parts forming a sawing-machine hereinafter described and claimed.

A represents the base or foundation of the machine, to which are bolted two upright frames or brackets, B, for supporting the operating mechanism of the machine.

C is the steam-cylinder, the rear head, D, of which has a bearing, E, formed upon or attached to its outer side to receive the shaft F, and is kept from lateral movement upon the said shaft by hollow gudgeons G, formed upon its ends, and through which the said shaft passes. The shaft F rocks in bearings in the brackets B.

To the forward head, H, of the cylinder C are attached the slides I, upon which works the cross-head J, attached to the piston-rod K. The piston-rod K passes through a stuffing-box in the cylinder-head H, and to its inner end is attached the piston L.

Upon the forward side of the cross-head J is formed, or to it is attached, a projecting plate, M, which is recessed upon one side to receive the butt of the saw N, as shown in Fig. 6.

In the upper and lower edges of the butt of the saw N are formed hook-shaped recesses O to receive the pins P, attached to the forward ends of the pairs of bars Q, the rear ends of which are hinged to the opposite sides of the upper and lower parts of the base of the plate M.

When the butt of the saw N has been inserted in the recess in the plate M, and the hinged bars Q adjusted to bring the pins P into the recesses O of the saw N, a key, R, is driven between the butt of the saw N and the shoulder of the recess in the plate M, and is secured in place by set-screws S, or other suitable means.

To the forward ends of the slides I is attached a plate, T, which has a slot formed through it to receive and serve as a guide to the saw N.

To the rear side of the upper part of the guide-plate T are hinged the rear ends of arms U, which are curved forward and downward, and to their forward ends is attached a bar, V, which is slotted to receive the saw N, and is made of such a length that the parts of its lower end will bear against the opposite sides of the saw N, just above the bases of its teeth, so as to hold the said saw steady and cause it to work true when starting a kerf. As the saw N cuts its way into the log the guide U V rests upon the log, the hinge of the arms U preventing the said guide from interfering with the downward movement of the said saw.

The ends of the cross-head J project, and to them are pivoted the forward ends of two connecting-rods, W, the rear ends of which are pivoted to crank-pins X, attached to the sides of the wheels Y, so that the said wheels will be revolved by the movements of the cross-head J as it is moved forward and back by the movements of the piston L. The wheels Y are made heavy to adapt them to serve as fly-wheels to give steadiness of motion to the piston L, and are rigidly attached to the shaft F to cause them to carry the said shaft with them in their revolution. The faces of the wheels Y are made smooth to adapt them to serve as friction-wheels to give motion to the friction-pulleys Z, which are attached to the ends of a shaft, $a$, journaled to the forward parts of the ends of the frame $b$, the rear parts of the ends of the said frame being hinged to the upper parts of the brackets B by bolts $c$, or other suitable means. The frame $b$ is turned upon its hinges to throw the pulleys Z into and out of contact with the wheels Y by means of a lever, $d$, the rear end of which is attached to the said frame, and its forward end projects into such a position that it can be readily reached and operated by the sawyer. The lever $d$ is held in either position by a notched catch-bar, $e$, attached to the frame of the machine, or other suitable support. As the friction-pulleys Z are raised out of contact with the friction-wheels Y they are brought into contact with the brake-shoes $f$, attached to the bar $g$, the ends of which are attached to the upper ends of the brackets B, so that the motion of the said friction-pulleys Z will be stopped as soon as the said pulleys have been raised out of contact with the friction-wheels Y.

To the shaft $a$, which is provided with flanges $h$, to adapt it to serve as a spool or drum, is attached the end of a rope or chain, $i$, which passes over guide-pulleys $j$, pivoted to the frame of the machine, or other suitable supports, at a proper distance above the operating parts of the said machine. The forward end of the rope or chain $i$ is attached to the guide-plate T.

As any style of reciprocating engine would run my sawing-machine, and as I intend at a future time to apply for Letters Patent on the engine here shown, I herein give no detailed description thereof.

With this construction the saw will be held down to its work by the gravity of the cylinder C and its attachments, will be vibrated by the direct action of the steam upon the piston L, and can be raised out of its kerf by throwing the friction-pulleys Z into contact with the friction-wheels Y, so that the saw can be readily controlled.

Having thus described my invention, what I claim as new, and desire to secure by Letters Patent, is—

1. In a sawing-machine constructed substantially as described, the cylinder of the engine, provided with a reciprocating piston carrying a saw at the outer end thereof, said cylinder being hung upon hollow gudgeons at its rear end to bear the weight of its forward end on the saw while sawing, in combination with a shaft passing through said gudgeons, wheels upon the ends of the shaft, cranks thereon, and rods connecting the cranks with the piston, and elevating mechanism operated by said wheels, whereby the engine will bear the same relation to said wheels at any angle of elevation, and the wheels may be at any time engaged with the elevating mechanism to raise the saw and the forward part of the engine, as described.

2. In a sawing-machine, the combination, with a saw notched on both sides, as described, of the cross-head J, provided with rabbeted plate M, the hinged pairs of bars Q, having pins P, and the key R, substantially as herein shown and described.

3. The rope-winding shaft $a$, the frame $b$, carrying the same, and hinged to frame B at $c$, and provided with a hand-lever, $d$, and the friction-pulley Z, secured upon shaft $a$, in combination with the balance-wheels Y of the engine, and the fixed brake-shoes $f$, as described, whereby the pulleys of the rope-winding device will be engaged with the balance-wheels of the engine when their supporting frame is swung one way, thus operating said device to raise the working end of the engine and the saw operated by it, and will be disengaged from said balance-wheels and be brought in contact with the fixed brake-shoes holding the parts as raised when swung the other way, as specified.

WILLIAM E. HILL.

Witnesses:
D. A. SHEPARDSON,
G. W. LOW.